(12) United States Patent  (10) Patent No.: US 9,076,579 B2
Hong et al.  (45) Date of Patent: Jul. 7, 2015

(54) MAGNETIC EXCHANGE COUPLED CORE-SHELL NANOMAGNETS

(75) Inventors: Yang-Ki Hong, Tuscaloosa, AL (US); Seok Bae, Ansan (KR)

(73) Assignee: The Board of Trustees of the University of Alabama for and on the behalf of the University of Alabama, Huntsville, AL (US)

( * ) Notice: Subject to any disclaimer, the term of this patent is extended or adjusted under 35 U.S.C. 154(b) by 0 days.

(21) Appl. No.: 13/885,371

(22) PCT Filed: Nov. 15, 2011

(86) PCT No.: PCT/US2011/060879
§ 371 (c)(1),
(2), (4) Date: Sep. 5, 2013

(87) PCT Pub. No.: WO2012/068178
PCT Pub. Date: May 24, 2012

(65) Prior Publication Data
US 2013/0342297 A1 Dec. 26, 2013

Related U.S. Application Data

(60) Provisional application No. 61/413,869, filed on Nov. 15, 2010.

(51) Int. Cl.
*H01F 1/00* (2006.01)
*H01F 3/00* (2006.01)
*G11B 5/706* (2006.01)

(52) U.S. Cl.
CPC *H01F 3/00* (2013.01); *G11B 5/706* (2013.01); *H01F 1/0054* (2013.01)

(58) Field of Classification Search
CPC .............................. H01F 1/00; G01R 33/383
USPC ...................... 335/297, 296, 302, 306
See application file for complete search history.

(56) References Cited

U.S. PATENT DOCUMENTS 6,045,925 A 4/2000 Klabunde et al.
6,338,900 B1 * 1/2002 Tada et al. ..................... 428/402
(Continued)

FOREIGN PATENT DOCUMENTS

WO 2008136131 A1 11/2008

OTHER PUBLICATIONS

Masala, et al., "Preparation of Magnetic Spinel Ferrite Core/Shell Nanoparticles Soft Ferrites on Hard Ferrites and Vice Versa," Science Direct, Solid State Sciences 8, (2006), pp. 1015-1022.
(Continued)

*Primary Examiner* — Forrest M Phillips
(74) *Attorney, Agent, or Firm* — Maynard Cooper & Gale, P.C.; Jon E. Holland

(57) ABSTRACT

A permanent magnet is fabricated such that it has a magnetically hard core surrounded by a thin magnetically soft shell. The magnetically hard core provides a relatively high intrinsic coercivity ($H_{ci}$), and the magnetically soft shell provides a relatively high magnetic flux density (B). Due to magnetic exchange coupling between the core and shell, a relatively high maximum energy product $(BH)_{max}$ is achievable over a wide temperature range, including temperatures above 150° C. Further, such effects can be achieved without using rare-earth metals or precious metals helping to keep the manufacturing costs of the magnet low. To allow sufficient exchange magnetic coupling between the core and shell, the width of the shell is less than about 40 nanometers, and the overall dimensions are controlled such that the width of the shell is less than two times the Bloch domain wall thickness of the core.

2 Claims, 9 Drawing Sheets $\delta_S$: Thickness of soft magnetic shell
$D_h$: Diameter of hard magnetic core-particle

(56) References Cited

U.S. PATENT DOCUMENTS

| | | | |
|---|---|---|---|
| 6,548,264 B1* | 4/2003 | Tan et al. | 435/7.21 |
| 6,972,046 B2 | 12/2005 | Sun et al. | |
| 7,029,514 B1* | 4/2006 | Yang et al. | 75/348 |
| 8,465,855 B2* | 6/2013 | Bradshaw et al. | 428/842.2 |
| 2009/0001983 A1 | 1/2009 | Wittkowski | |
| 2009/0039994 A1* | 2/2009 | Pieper et al. | 335/297 |
| 2009/0206975 A1* | 8/2009 | Nuetzel et al. | 336/233 |
| 2010/0054981 A1 | 3/2010 | Liu | |
| 2010/0104767 A1 | 4/2010 | Sskuma et al. | |
| 2010/0215851 A1 | 8/2010 | Shoji et al. | |

OTHER PUBLICATIONS

Kim, et al., "A Study of Exchange-Coupling Effect on Nd2Fe14B / αFe Forming Core/Shell Shape," Sold State Phenomena vol. 119 (2007), pp. 147-150.

Zhou, et al., "Magnetization Reversal in Particulate L10 Nanostructures," Scripta Materialia 53, (2005), pp. 453-456.

Chaubey, et al., "Synthesis and Characterization of Bimagnetic Bricklike Nanoparticies," American Chemical Society, Chemical Material, 2008, 20, pp. 475-478.

Zhang et al., "Synthesis and Characerzation of SrFe12O19/CoFe2O4 Nanocomposites with Core-Shell Structure,", Journal of Alloys and Compounds 469, (2009), pp. 422-426.

Hong, et al., "Exchange Coupled Magnetic Nanocomposites of Sm(CO1-xFEx)5/Fe3O4 with Core/Shell Structure," Science Direct, Solid State Communications 141, (2007) pp. 541-544.

Jung, et al., "Epitaxial Growth of NiZn Ferrite on Barium Ferrite Particles," IEEE Transactions on Magnetics, vol. 34, No. 4, Jul. 1998, pp. 1675-1677.

* cited by examiner $\delta_s$: Thickness of soft magnetic shell
$D_h$: Diameter of hard magnetic core-particle

MAGNETIC EXCHANGE COUPLED CORE-SHELL NANOMAGNETS

CROSS REFERENCE TO RELATED APPLICATION

This is a national stage application of and claims priority to International Application No. PCT/US11/60879, entitled "Magnetic Exchange Coupled Core-Shell Nanomagnets" and having an international filing date of Nov. 15, 2011, which is incorporated herein by reference. International Application No. PCT/US11/60879 claims priority to U.S. Provisional Patent Application No. 61/413,869, entitled "Magnetic Exchange Coupled Core-Shell Nanomagnets" and filed on Nov. 15, 2010, which is incorporated herein by reference.

RELATED ART

Permanent magnets are currently used in a variety of applications, including electric motor applications, such as electric vehicles and windmill generators. Unfortunately, the performance of many permanent magnets degrades at high temperature making them unsuitable in some applications, such as electric motor applications where temperatures often exceed 150° Celsius (C). Further, many permanent magnets have expensive materials, such as precious metals or rare-earth metals, which has limited availability.

As an example, several rare-earth magnets, including $Nd_2Fe_{14}B$, Dy-doped $Nd_2Fe_{14}B$, SmCo, and $Sm_2Fe_{17}N_3$, have been used or considered for motors of hybrid and electric vehicles. Of such magnets, $Nd_2Fe_{14}B$ generally provides the highest maximum energy product $(BH)_{max}$. However, the operation temperature of this magnet is limited to around 150° C., which is attributed to a low Curie temperature of around 310 to 400° C. Furthermore, magnetization decreases with temperature and generally disappears at about the Curie temperature. To increase the operation temperature, Dy can be added, but this addition increases coercivity and decreases magnetization. Therefore, the substitution effect is relatively insignificant.

Thus, a heretofore unaddressed need exists in the art for inexpensive permanent magnets capable of efficiently operating at high temperature.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to magnetic exchange coupled core-shell nanomagnets. In one exemplary embodiment, a permanent magnet is fabricated such that it has a magnetically hard core surrounded by a thin magnetically soft shell. The magnetically hard core provides a relatively high intrinsic coercivity $(H_{ci})$, and the magnetically soft shell provides a relatively high magnetic flux density (B). Due to magnetic exchange coupling between the core and shell, a relatively high maximum energy product $(BH)_{max}$ is achievable over a wide temperature range, including temperatures above 150° C. Further, such effects can be achieved without using rare-earth metals or precious metals helping to keep the manufacturing costs of the magnet low. To allow sufficient exchange magnetic coupling between the core and shell, the overall shell thickness is controlled such that the width of the shell is less than two times the Bloch domain wall thickness of the core.

Figure 1:
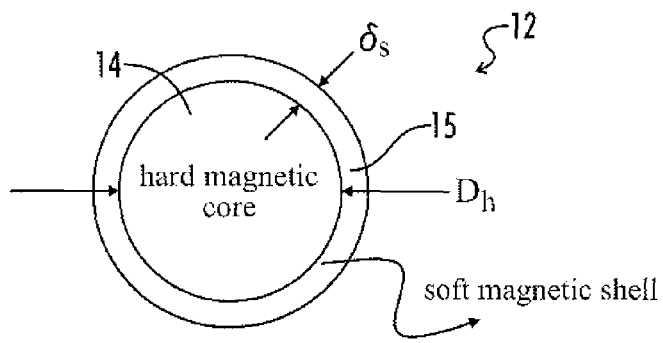
FIG. 1 depicts an exemplary embodiment of a nanomagnet particle having a magnetically hard core surrounded by a magnetically soft shell.

FIG. 1 depicts an exemplary core-shell nanomagnet particle 12 manufactured to have a core 14 composed of magnetically hard material and a shell 15 composed of a magnetically soft material. In one exemplary embodiment, the material of the core 14 includes Mn, Al, Bi, Sr, Pb, Fe, or O (with at least one hard magnetic element though more preferably with at least two hard magnetic elements), and the material of the shell includes Fe, Co, Ni, Al, Si, N, or O (with at least one soft magnetic element though more preferably with at least two soft magnetic elements). As an example, the magnetically hard core 14 may be composed of MnAl or M-type hexaferrite ($BaFe_{12}O_{19}$) or MnBi, and the magnetically soft shell 15 may be composed of $Fe_{65}Co_{35}$, Permalloy ($Fe_{20}Ni_{80}$), or Sendust (FeAlSi). However, in other embodiments, other elements and/or combination of elements are possible.

The shape of the core-shell particle 12, as well as the core 14, is generally spherical, though it can have other shapes, such as needlelike or hexagonal, in other embodiments. Further, the shell 15 forms a hollow sphere that encompasses and surrounds the core 14, and the core 14 fills the void within the hollow sphere. In other embodiments, other shapes of the shell 15, such as cylinder, cube, or hexagon, are possible. In one exemplary embodiment, the thickness of the shell 15 ($\delta_s$) is between about 20 nm and 40 nm, and such thickness is less than two times the Bloch domain wall thickness of the core 14. Further, the thickness of the shell 15 is uniform around the core 14. However, it should be emphasized that other shapes and configurations of the core-shell particle 12 are possible in other embodiments.

The $(BH)_{max}$ for the core-shell particle 12 can be characterized by the following formulas (assuming that $M_r=M_s$).

$$M_r = f_h M_h + f_s M_s \text{ when } M_s = M_r \longrightarrow \begin{array}{l} \text{Eq. (6), R. Skomshi} \\ \text{P.3591, E. Kneller} \end{array} \quad (1)$$

$$\mu_0 H_N = 2 \frac{f_s K_s + f_h K_h}{f_s M_s + f_h M_h} \longrightarrow \text{Eq. (8), R. Skomski} \quad (2)$$

$$\left. \begin{array}{l} (BH)_{max} = \dfrac{\mu_0 M_r^2}{4} \text{ for } H_N > \dfrac{M_r}{2} \\ (BH)_{max} = \dfrac{\mu_0 H_N M_r}{2} \text{ for } H_N < \dfrac{M_r}{2} \end{array} \right\} \begin{array}{l} \text{p.15814, R. Skomski} \\ \text{P.3588, E. Kneller} \end{array} \quad \begin{array}{l}(3)\\(4)\end{array}$$

$M_r$: Remanence of hard + soft phases
$M_s$: Saturation magnetization of soft magnetic phase
$M_h$: Saturation magnetization of hard magnetic phase
$K_h$: Magnetic anisotropy energy of hard magnetic phase
$K_s$: Magnetic anisotropy energy of soft magnetic phase
$f_h$: Volume fraction of hard magnetic phase
$f_s$: Volume fraction of soft magnetic phase
$\mu_0$: $4\pi \times 10^{-7} N/A^2$

[Ref1] R. Skomski. and J. MD Coey. "Grant energy product in nanostructured two-phase magnets", *Phys. Rev. B.* 48, 21 (1993)

[Ref2] E. F. Kneller, and R Hawig, "The exchange-spring magnet. A new material principle for permanent magnets", *IEEE Trans. Magn.* 27, pp 388-3600, (1991)

Assuming $M_r = 0.7 M_s$, $B_r = \mu_0 M_r$, (5)
Therefore, $B_r = 0.7 \mu_0 M_s$, $B_r = 0.7 B_s$ $$M_r = \frac{f_h B_{r\_hard} + f_s B_{r\_soft}}{\mu_0}$$

$$= \frac{f_h B_{r\_hard} + (1-f_h) B_{r\_soft}}{\mu_0} [A/m]$$

$$= \frac{0.7[B_{s\_soft} - f_h(B_{s\_soft} - B_{s\_hard})]}{\mu_0} [A/m]$$

For $H_N > \dfrac{M_r}{2}$ $$(BH)_{max} = \frac{\mu_0 M_r^2}{4} \quad (6)$$

$$= \frac{\mu_0 \{0.7[B_{s\_soft} - f_h(B_{s\_soft} - B_{s\_hard})]\}^2}{4 \mu_0^2} \left[\frac{N}{A^2} \frac{A^2}{m^2}\right]$$

$$= \left[\frac{N}{A \cdot m} \frac{A}{m}\right]$$

$$= [T \cdot A/m]$$

$$= \frac{0.49\pi [B_{s\_soft} - f_h(B_{s\_soft} - B_{s\_hard})]^2}{10^5 \times \mu_0}$$

$$= \frac{4.9\pi [B_{s\_soft} - f_h(B_{s\_soft} - B_{s\_hard})]^2}{10^6 \times \mu_0} [MG \cdot Oe]$$

For $H_N < \dfrac{M_r}{2}$ $$(BH)_{max} = \frac{\mu_0 H_N M_r}{2} \quad (7)$$

$$= \frac{2\left(\dfrac{f_s K_s + f_h K_h}{f_s M_s + f_h M_h}\right)(f_s M_s + f_h M_h)}{2}$$

$$= f_s K_s + f_h K_h$$

$$= (1 - f_h) K_s + f_h K_h$$

$$= K_s + f_h (K_h - K_s)$$

$$= \frac{4\pi [K_s + f_h(K_h - K_s)]}{10^5} [Mg \cdot Oe]\left[\frac{J}{m^3}\right]$$

$$= \left[\frac{kg \cdot m^2}{sec^2 \, m^3}\right]$$

$$= \left[\frac{kg}{sec^2 \, m} \frac{A}{A}\right]$$

$$= \left[\frac{kg}{sec^2 \, A} \frac{A}{m}\right]$$

$$= \left[T \frac{A}{m}\right]$$

$$= \left[\frac{N}{m^2}\right]$$

$B_{s\_soft}$: $B_s$ of soft magnetic phase [T]
$B_{h\_hard}$: $B_s$ of hard magnetic phase [T]

Figure 2:
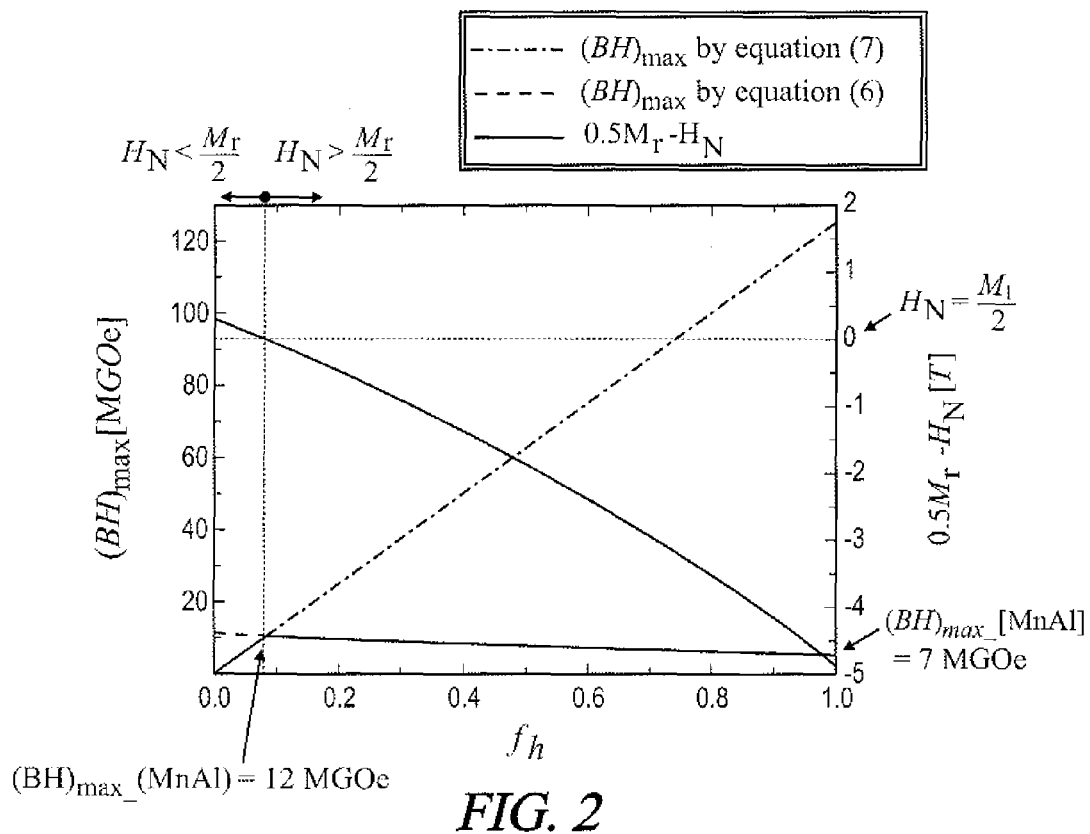
FIG. 2 is a plot of maximum energy product $(BH)_{max}$ for a nanomagnet particle having a magnetically hard core (MnAl) surrounded by a magnetically soft shell (permalloy).

FIG. 2 shows $(BH)_{max}$ of a τ-phase MnAl-permalloy core-shell nanomagnet in terms of volume fraction of hard core ($f_h$). The hard magnetic τ-MnAl core (saturation magnetization=0.7 T; magnetic anisotropy constant $K_h$=1 MJ/m$^3$) and soft magnetic permalloy shell (saturation magnetization=1 T; magnetic anisotropy constant $K_s$=0.01 MJ/m$^3$) were used.

Equations (6) and (7) were used to calculate $(BH)_{max}$ of MnAl-permalloy core-shell nanomagnet for $H_n > M_r/2$ and $H_n < M_r/2$, respectively. It is noted that $(BH)_{max}$ is about 12 MGOe at $H_n = M_r/2$ and $f_h = 8\%$, while $(BH)_{max}$ of pure ($f_h = 100\%$) MnAl nanomagnet is about 7 MGOe.

Figure 3:
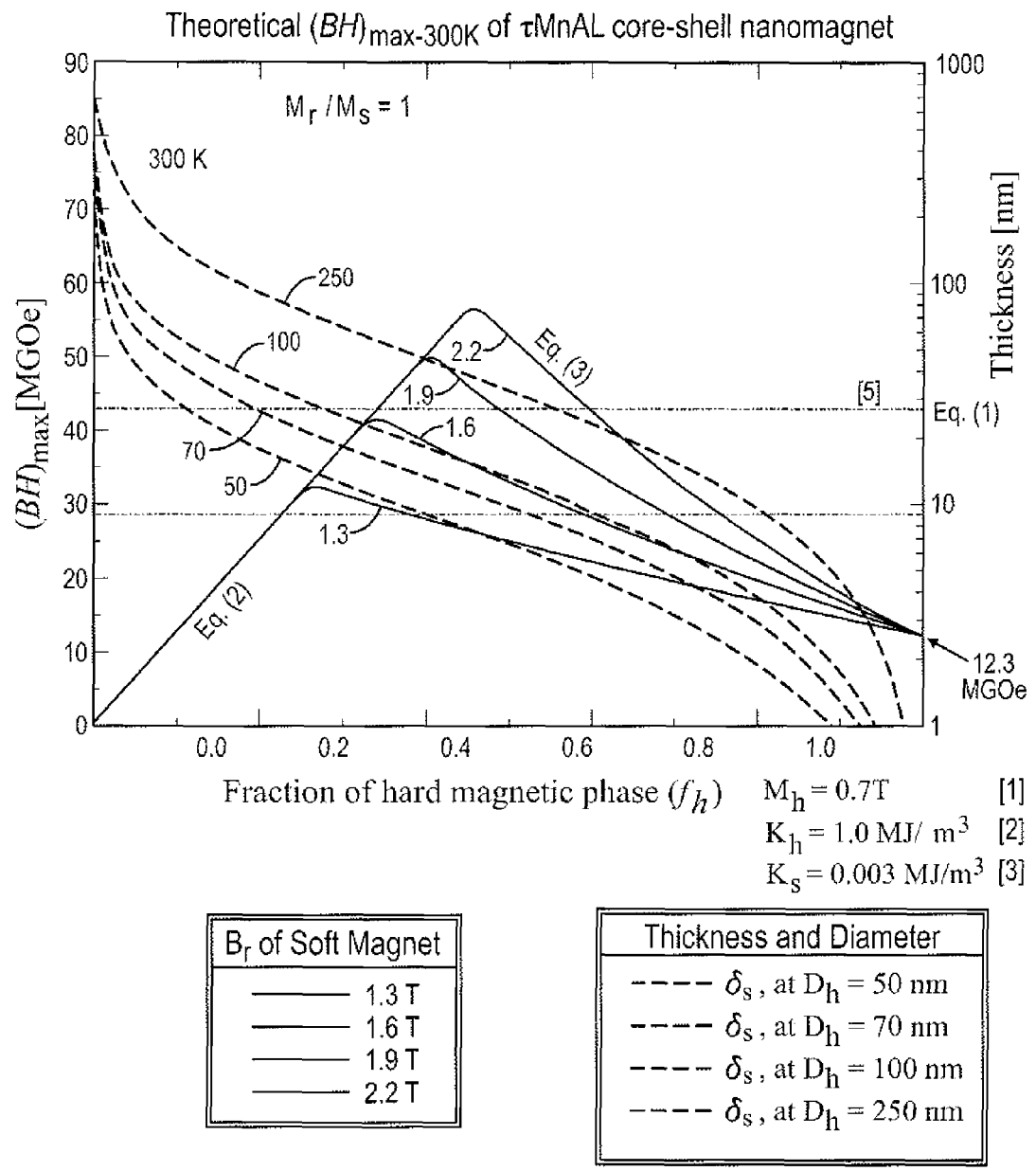
FIG. 3 is a plot of volume fraction $(f_h)$ of hard magnetic phase dependent $(BH)_{max}$ for a nanomagnet particle having a magnetically hard core (τ-MnAl) surrounded by a magnetically soft shell at 300 Kelvin (K) where $M_r/M_s=1$ and saturation magnetization of soft shell is in the range of 1.3 to 2.2 T.

A τ-phase MnAl core-soft shell nanomagnet (i.e., a nanomagnet having τ-phase MnAl forming the hard magnetic core 14) where the shell 15 is composed of a soft magnetic alloy was used to calculate $(BH)_{max}$ in terms of saturation magnetization ($M_s$) and shell thickness ($\delta_s$) using equations (6) and (7). However, it is generally desirable for the shell thickness ($\delta_s$) to be smaller than about 2 times the Bloch domain wall thickness of the core 14 to allow efficient exchange magnetic coupling between the core 14 and shell 15. This is because the exchange magnetic coupling becomes weaker as the shell thickness increases over the Bloch domain wall thickness. The Bloch domain wall thickness for τ-phase MnAl is about 15 nm [G. G. Korznikova, J. of Microscopy, Vol. 239, 239, 2010]. Therefore, shell thickness is preferably thinner than 30 nm. FIG. 3 shows the $(BH)_{max}$ of MnAl—CoFe (2.2 T) core-shell nanomagnet becomes about 55 MGOe when exchange coupling exists. This high $(BH)_{max}$ is attributable to the exchange coupling.

Figure 9:
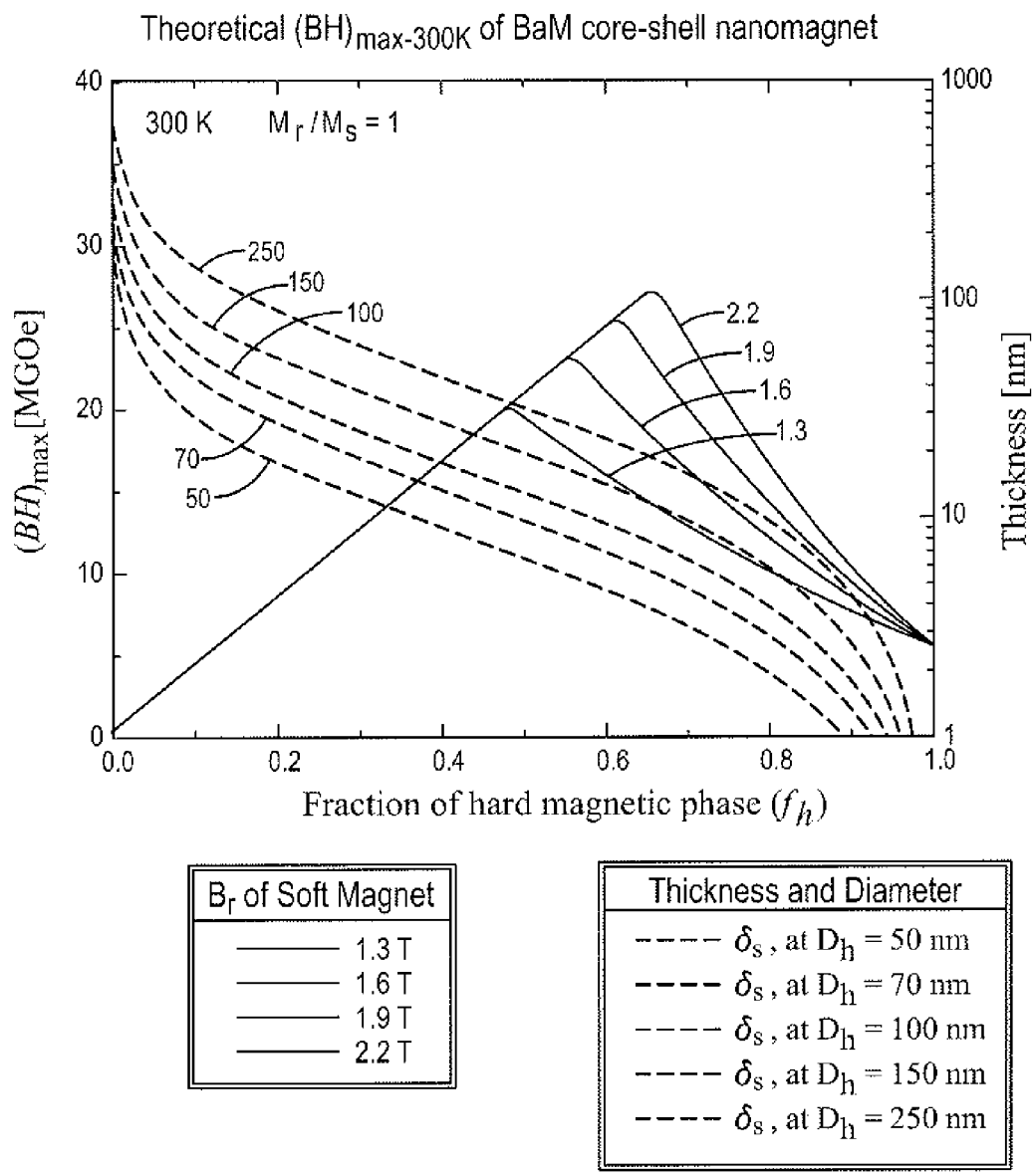
FIG. 9 is a plot of volume fraction $(f_h)$ of hard magnetic phase dependent $(BH)_{max}$ for a nanomagnet particle having a magnetically hard core (BaM) surrounded by a magnetically soft shell at 300 K where $M_r/M_s=1$ and saturation magnetization of soft shell is in the range of 1.3 to 2.2 T.

In another embodiment, a barium ferrite (BaM: $BaFe_{12}O_{19}$)—$Fe_{65}Co_{35}$ core-shell nanomagnet was used to calculate $(BH)_{max}$. FIG. 9 shows $(BH)_{max}$ of such nanomagnet as a function of volume fraction ($f_h$) of hard BaM core. The $(BH)_{max}$ was estimated to be about 22.5 MGOe for $f_h$ equal to 55%. About 11 nm thick shell for 100 nm barium ferrite particle is desired to provide approximately 22.5 MGOe as the Bloch domain wall thickness for barium ferrite is about 14 nm [M. Ziese and M. J. Thornton, Spin Electronics, p. 220, Spring 2001].

Figure 4:
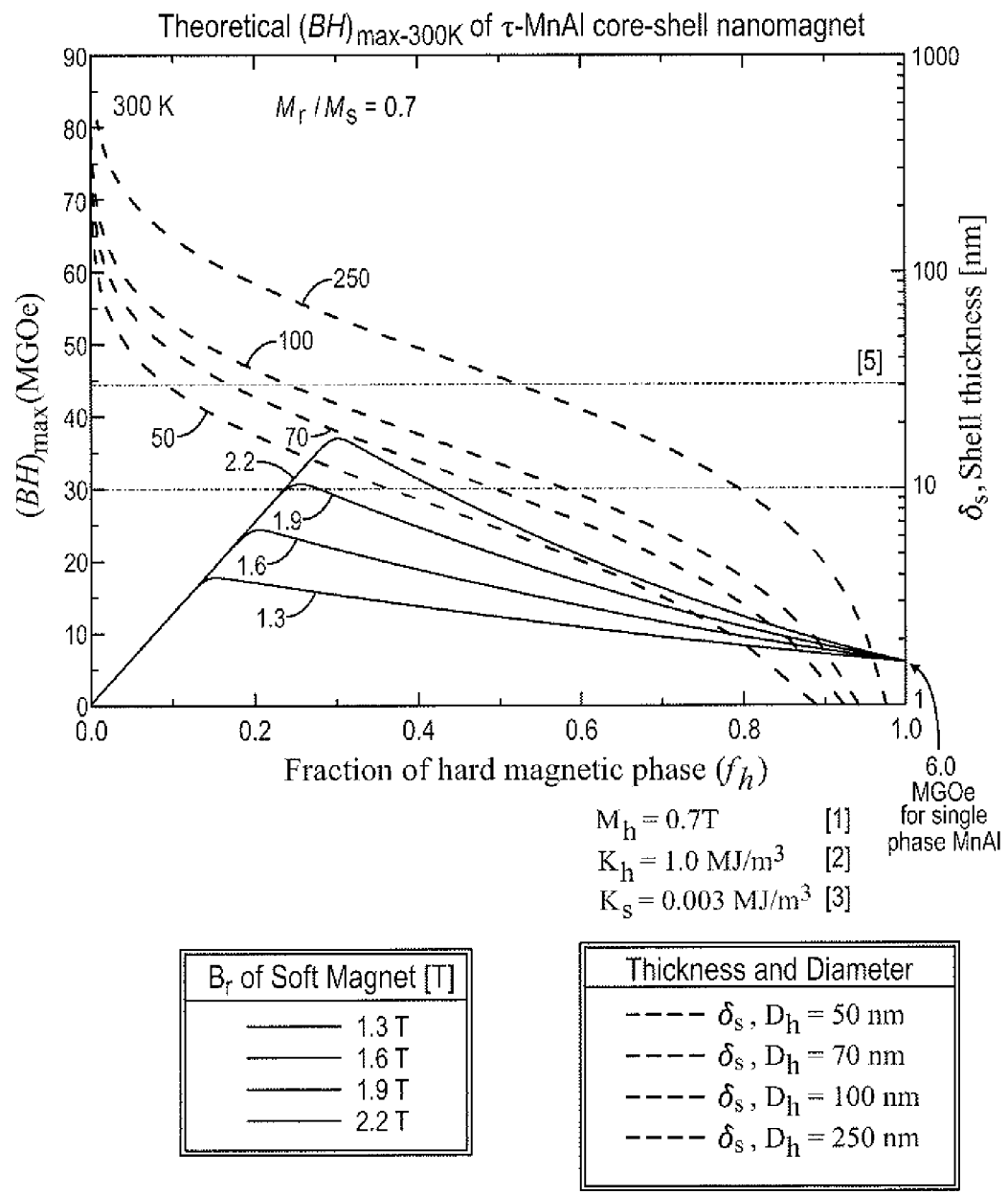
FIG. 4 is a plot of volume fraction $(f_h)$ of hard magnetic phase dependent $(BH)_{max}$ for a nanomagnet particle having a magnetically hard core (τ-MnAl) surrounded by a magnetically soft shell at 300 Kelvin (K) where $M_r/M_s=0.7$ and saturation magnetization of soft shell is in the range of 1.3 to 2.2 T.
Figure 5:
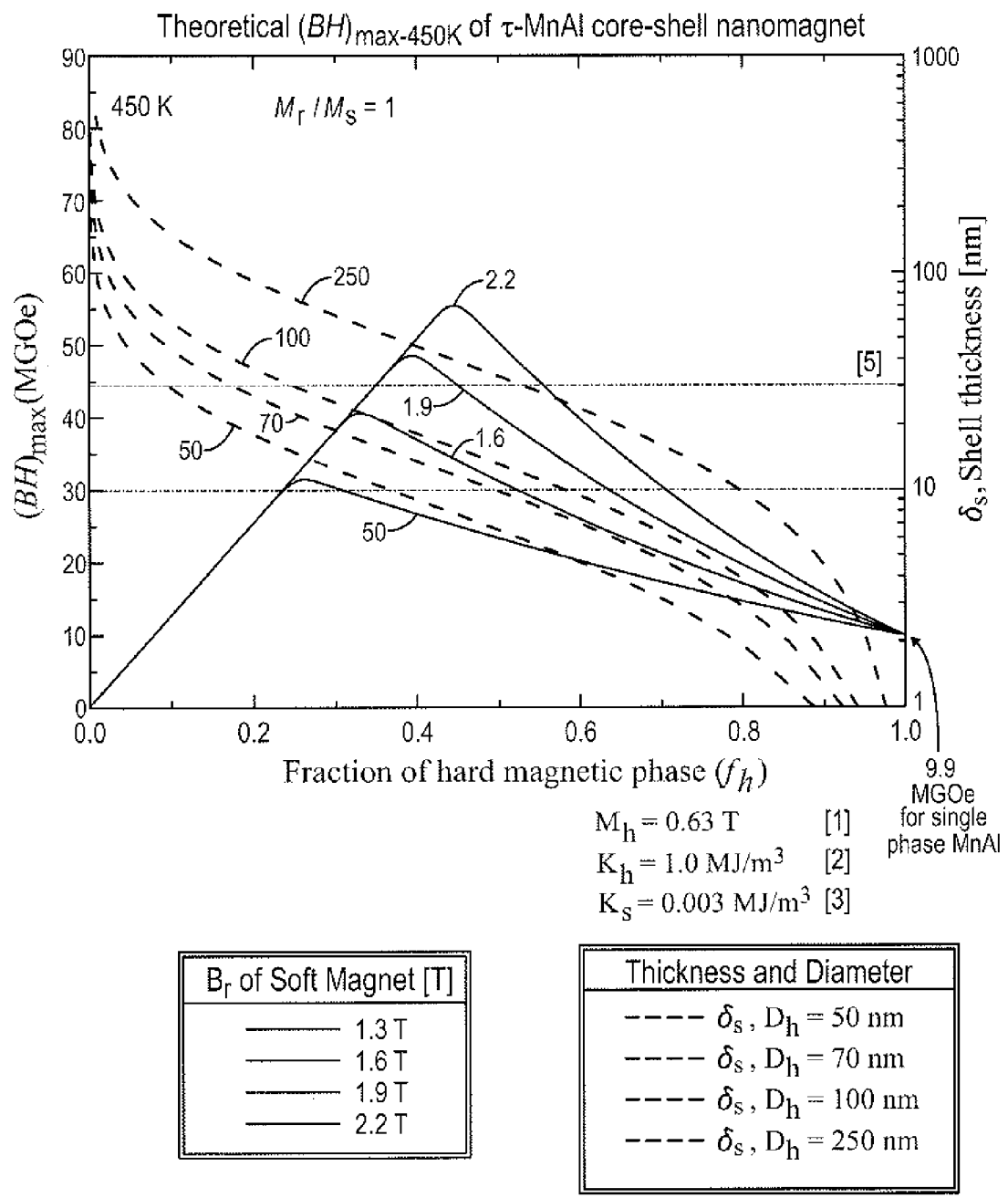
FIG. 5 is a plot of volume fraction $(f_h)$ of hard magnetic phase dependent $(BH)_{max}$ for a nanomagnet particle having a magnetically hard core (τ-MnAl) surrounded by a magnetically soft shell at 450 Kelvin (K) where $M_r/M_s=1$ and saturation magnetization of soft shell is in the range of 1.3 to 2.2 T.
Figure 6:
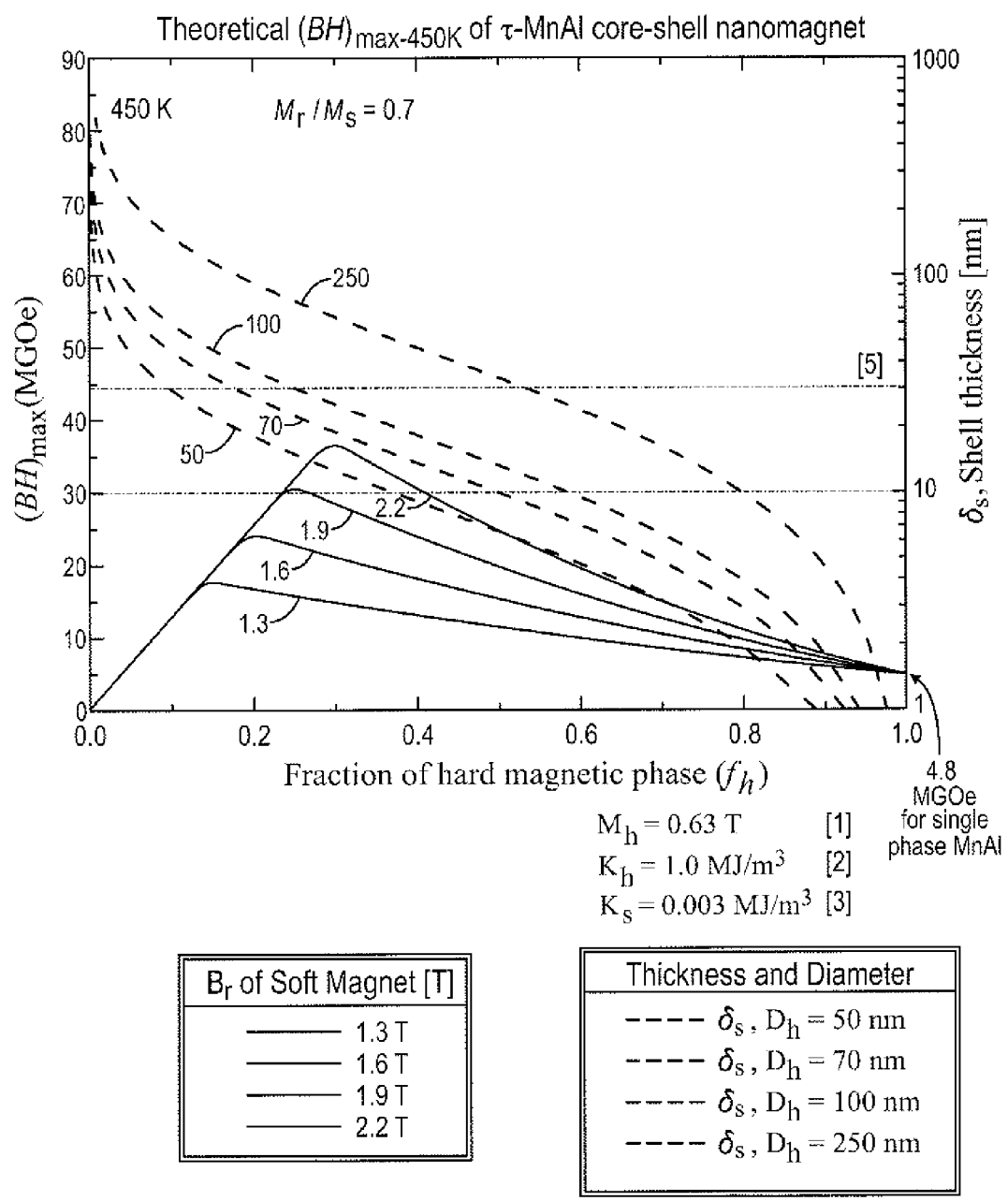
FIG. 6 is a plot of volume fraction $(f_h)$ of hard magnetic phase dependent $(BH)_{max}$ for a nanomagnet particle having a magnetically hard core (τ-MnAl) surrounded by a magnetically soft shell at 450 Kelvin (K) where $M_r/M_s=0.7$ and saturation magnetization of soft shell is in the range of 1.3 to 2.2 T.
Figure 7:
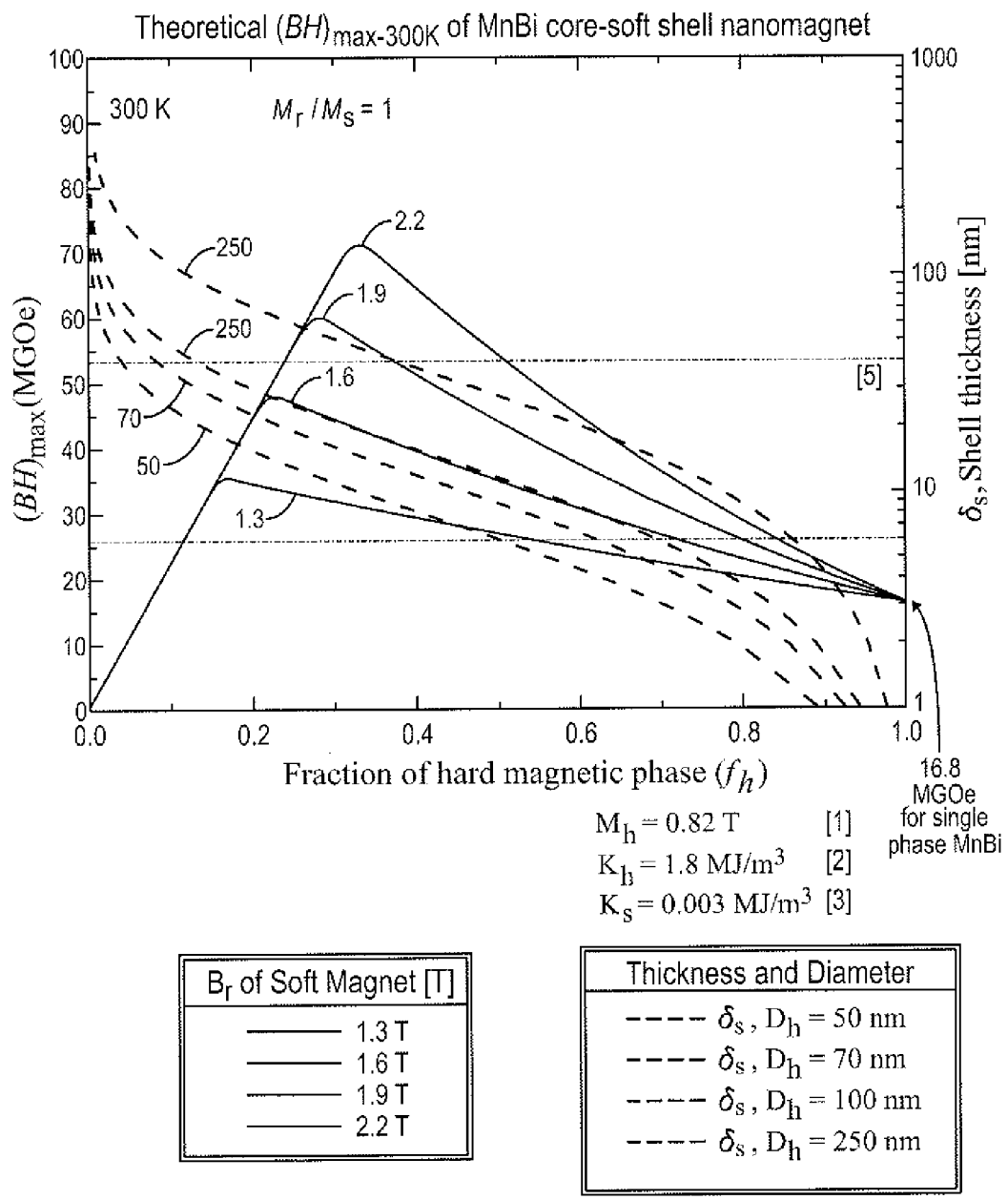
FIG. 7 is a plot of volume fraction $(f_h)$ of hard magnetic phase dependent $(BH)_{max}$ for a nanomagnet particle having a magnetically hard core (MnBi) surrounded by a magnetically soft shell at 300 K where $M_r/M_s=1$ and saturation magnetization of soft shell is in the range of 1.3 to 2.2 T.
Figure 8:
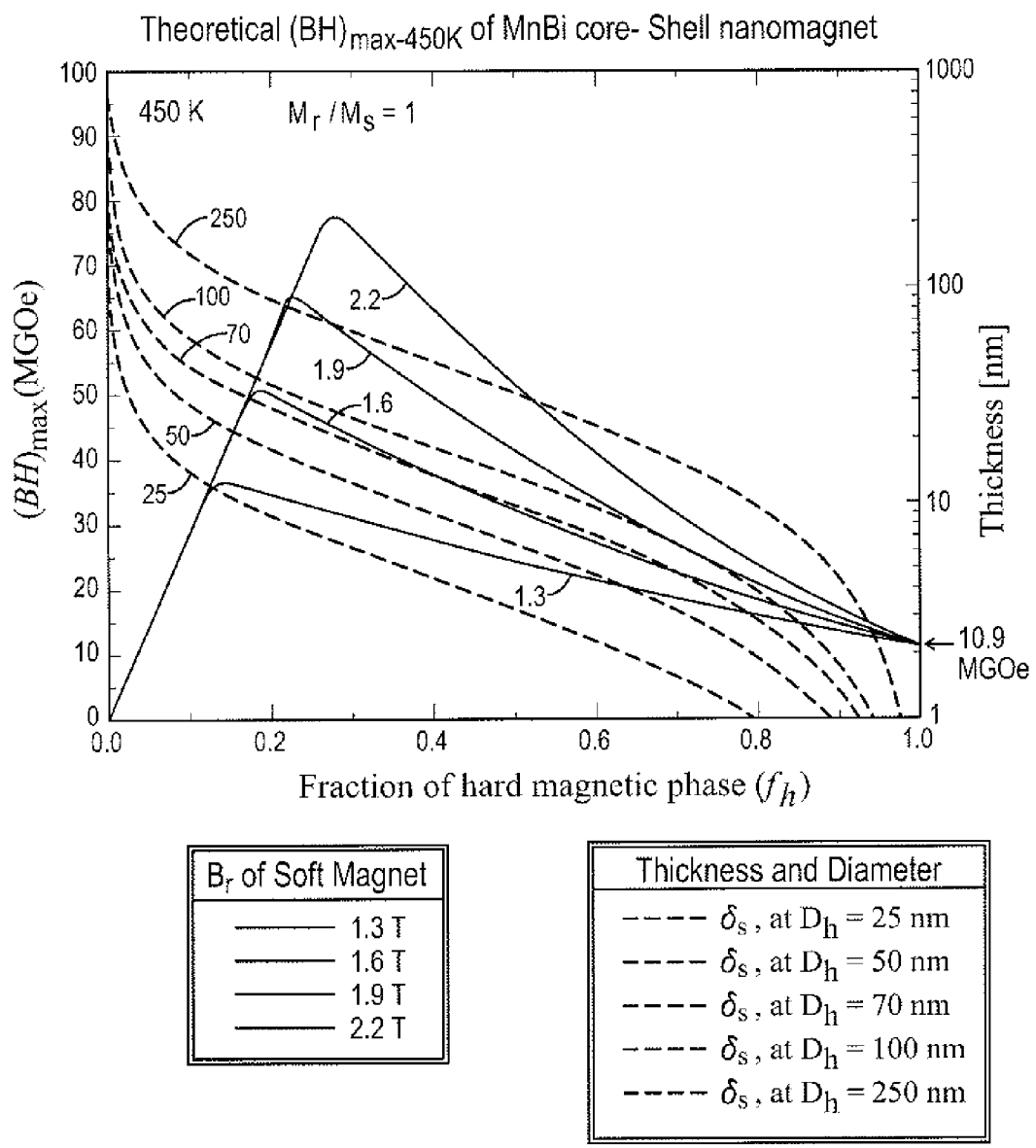
FIG. 8 is a plot of volume fraction $(f_h)$ of hard magnetic phase dependent $(BH)_{max}$ for a nanomagnet particle having a magnetically hard core (MnBi) surrounded by a magnetically soft shell at 450 K where $M_r/M_s=1$ and saturation magnetization of soft shell is in the range of 1.3 to 2.2 T.
Figure 10:
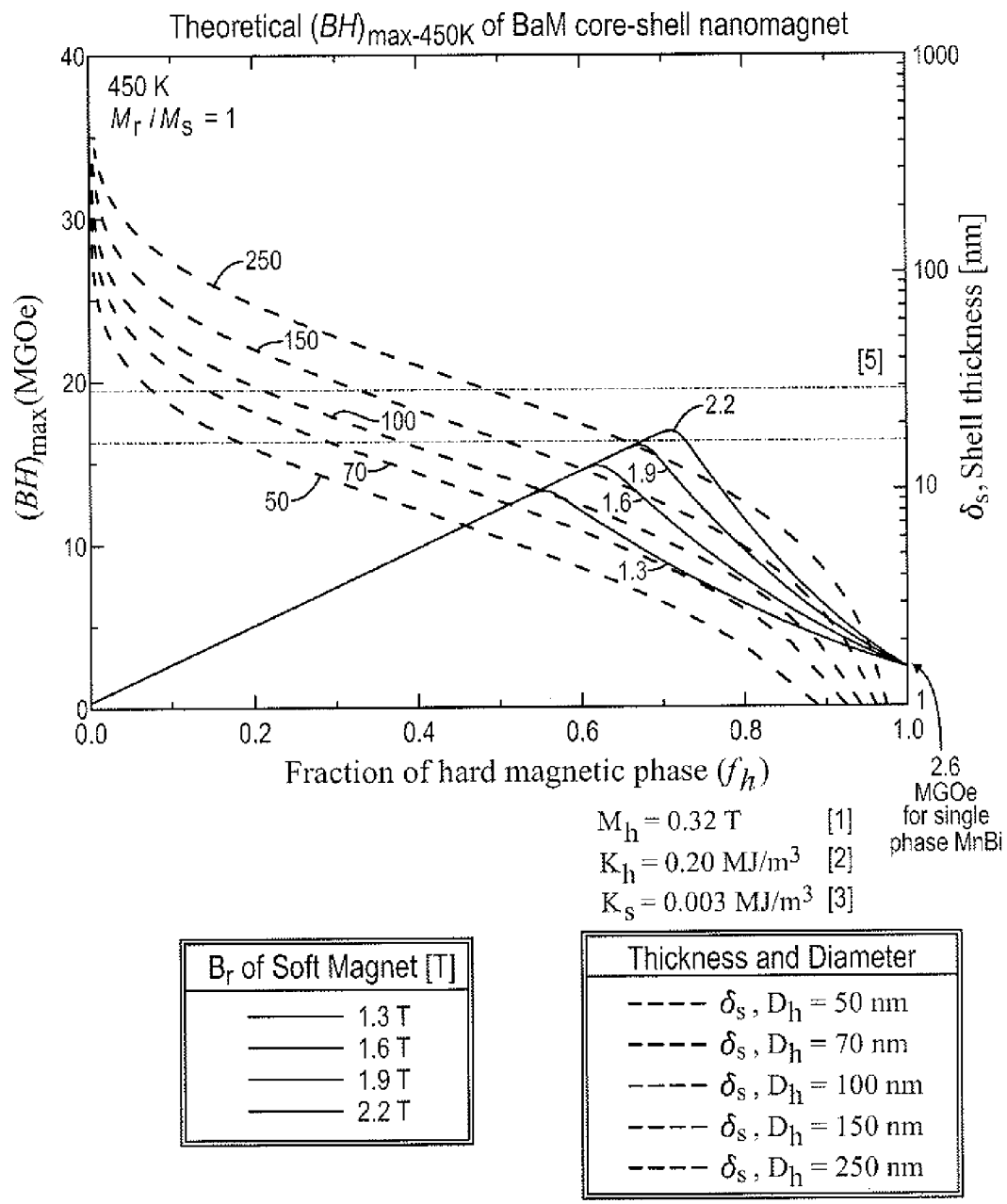
FIG. 10 is a plot of volume fraction $(f_h)$ of hard magnetic phase dependent $(BH)_{max}$ for a nanomagnet particle having a magnetically hard core (BaM) surrounded by a magnetically soft shell at 450 K where $M_r/M_s=1$ and saturation magnetization of soft shell is in the range of 1.3 to 2.2 T.

FIGS. 4-10 depict estimate of $(BH)_{max}$ for various core-shell nanomagnets for different temperatures. In particular, FIG. 3 depicts a plot of $(BH)_{max}$ at 300 K using τ-MnAl for the core 14 where $M_r/M_s=1$, and FIG. 4 depicts a plot of $(BH)_{max}$ at 300 K using τ-MnAl for the core 14 where $M_r/M_s=0.7$. FIG. 5 depicts a plot of $(BH)_{max}$ at 450 K using τ-MnAl for the core 14 where $M_r/M_s=1$, and FIG. 6 depicts a plot of $(BH)_{max}$ at 450 K using τ-MnAl for the core 14 where $M_r/M_s=0.7$. FIG. 7 depicts a plot of $(BH)_{max}$ at 300 K using MnBi for the core 14 where $M_r/M_s=1$, and FIG. 8 depicts a plot of $(BH)_{max}$ at 450 K using MnBi for the core 14 where $M_r/M_s=1$. Further, FIG. 9 depicts a plot of $(BH)_{max}$ at 300 K using BaM for the core 14 where $M_r/M_s=1$, and FIG. 10 depicts a plot of $(BH)_{max}$ BaM at 450 K using for the core 14 where $M_r/M_s=1$.

Note that there are various techniques that could be used to fabricate a nanomagnet, as described herein, including electroless plating, chemical and physical synthesis, and embedding core-shell nanomagnets in a polymeric matrix.

In one exemplary embodiment, M-type hexaferrite nanoparticles and anionic surfactant are mixed in distilled water, while mechanically stirring with argon gas purging and then washed with deionized water. The anionic surfactant allows $Fe^{2+}$ and $Co^{2+}$ cations to adhere to the core hexaferrite particles. When the anionic surfactant is dispersed in water, the hydrophilic head is likely to face to water, while the hydrophobic tail avoids water. The choice of the anionic surfactant could be sodium dodecyl sulfate (SDS), sodium laurilsulfate or sodium lauryl sulfate (SLS), though other anionic surfactants are possible. Aqueous solutions of SDS have been conventionally used for dispersing (or suspending) magnetite ($Fe_3O_4$) particles. Note that the M-type hexaferrite core particle is already an oxide. Therefore, the hexaferrite is chemically stable, but not Fe and Co. Prior to adding $FeCl_2.4H_2O$ and $CoCl_2.6H_2O$ precursory shell materials to the solution, the anionic surfactant containing solution may be deaerated by purging with Ar gas. The purging preferably continues until the end of the coating process. Reduction agent $NdBH_4$ is dropped into the solution at a desired flow rate, and transition metal ions are thereby brought to their metallic state. The Co—Fe coated M-type hexaferrites is filtered and dried in an oven at about 80° C. This same process is also applicable to manufacturing of MnAl and MnBi core-shell nanoparticles under an inert atmosphere. In other embodiments, other techniques can be used for fabricating nanomagnet particles.

Now, therefore, the following is claimed:

1. A core-shell nanomagnetic particle, comprising:
   a core of hard magnetic material; and
   a shell of soft magnetic material encasing the core,
   wherein a thickness of the shell is less than 40 nanometers and less than two times a Bloch domain thickness of the core, and wherein the core does not include rare-earth elements.

2. The core-shell nanomagnet particle of claim 1, wherein the shell has a uniform thickness around the core.

\* \* \* \* \*